US012794891B2

(12) United States Patent
Wei et al.

(10) Patent No.: US 12,794,891 B2
(45) Date of Patent: Nov. 10, 2026

(54) SYSTEMS AND METHODS FOR CONTROLLING ACCESSING AND STORING OBJECTS BETWEEN ON-PREM DATA CENTER AND CLOUD

(71) Applicant: Aviatrix Systems, Inc., Santa Clara, CA (US)

(72) Inventors: Xiaobo Sherry Wei, Santa Clara, CA (US); Ramakrishnan Kunnath, Santa Clara, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 81 days.

(21) Appl. No.: 18/974,351

(22) Filed: Dec. 9, 2024

(65) Prior Publication Data

US 2025/0106212 A1 Mar. 27, 2025

Related U.S. Application Data

(63) Continuation of application No. 18/111,594, filed on Feb. 19, 2023, now Pat. No. 12,166,760, which is a continuation of application No. 17/010,820, filed on Sep. 2, 2020, now Pat. No. 11,588,819.

(60) Provisional application No. 62/968,103, filed on Jan. 30, 2020.

(51) Int. Cl.
*H04L 29/06* (2006.01)
*G06F 9/455* (2018.01)
*H04L 9/40* (2022.01)
*H04L 12/66* (2006.01)
*H04L 67/1036* (2022.01)

(52) U.S. Cl.
CPC .............. *H04L 63/10* (2013.01); *G06F 9/455* (2013.01); *H04L 12/66* (2013.01); *H04L 63/0227* (2013.01); *H04L 63/20* (2013.01); *H04L 67/1036* (2013.01)

(58) Field of Classification Search
CPC ..... H04L 63/10; H04L 63/0227; H04L 63/20; H04L 63/0272; H04L 63/101
See application file for complete search history.

(56) References Cited

U.S. PATENT DOCUMENTS 9,473,298 B2 * 10/2016 Wante .................. H04W 12/02
9,654,508 B2 * 5/2017 Barton ................ H04L 63/0272
2020/0311034 A1 * 10/2020 Brand ..................... G06F 16/13

* cited by examiner

*Primary Examiner* — Longbit Chai
(74) *Attorney, Agent, or Firm* — Jackson Walker LLP

(57) ABSTRACT

In an embodiment, a secure object transfer system is described. The system features a virtual private cloud network (VPC) and a controller. The VPC includes a plurality of gateways and a network load balancer, which configured to conduct a load balancing scheme on access messages from computing devices deployed within an on-premises network to direct the access memory to one of the plurality of gateways for storage or retrieval of an object from a cloud-based storage element. Each gateway includes filtering logic to restrict access of the computing devices to certain cloud-based storage elements in accordance with a security policy. The controller is configured to maintain and update the security policy utilized by each gateway of the plurality of gateways.

20 Claims, 6 Drawing Sheets

SYSTEMS AND METHODS FOR CONTROLLING ACCESSING AND STORING OBJECTS BETWEEN ON-PREM DATA CENTER AND CLOUD

CROSS-REFERENCE TO RELATED APPLICATIONS

This Application is a continuation of U.S. patent application Ser. No. 18/111,594, filed on Feb. 19, 2023, and U.S. patent application Ser. No. 17/010,820, filed on Sep. 2, 2020, which claims the benefit of priority on U.S. Provisional Patent Application No. 62/968,103, filed Jan. 30, 2020. The entire contents of each of which are incorporated by reference herein.

FIELD

Embodiments of the disclosure relate to the field of networking. More specifically, one embodiment of the disclosure relates to a system and method for securely transferring data between public cloud storage services and one or more computing devices deployed within an on-premises network.

GENERAL BACKGROUND

Over the past few years, cloud computing has provided an Infrastructure as a Service (IaaS), where resources are provided as part of a public cloud network and are made accessible to company users (e.g., administrators, end users, etc.) as a service. One of these services allows users to store data within a public-cloud storage service, in particular one or more cloud storage elements such as Simple Storage Service (S3) buckets provided by AMAZON WEB SERVICES™ (AWS). In some deployments, the S3 buckets are accessible via a high-speed communication link such as AWS's "Direct Connect" for example.

Herein, Direct Connect is a cloud service solution that supports a dedicated, private network connection from on-premises networked devices to AWS in lieu of an Internet-based connection. More specifically, Direct Connect may be used to provide a dedicated, high-speed network connection between networked devices operating as part of an on-premises network (e.g., enterprise network) and one of the AWS Direct Connect locations that are part of the global AWS public cloud. Relying on virtual local area networks (VLANs), such as industry standard IEEE 802.1q VLANs for example, this dedicated connection can be partitioned into multiple virtual interfaces. Hence, Direct Connect is capable of supporting concurrent communication sessions with different on-premises networked devices and this same connection may be used to access different resources such as objects stored in different S3 buckets at a particular storage region.

As stated above, Direct Connect can be leveraged for high-speed copying of one or more objects to selected S3 buckets. Since S3 is a public cloud service, however, the native solution for establishing Direct Connect with an on-premises ("on-prem") network is to use a public virtual interface (VIF) to advertise the entire S3 public address range to users of the on-premises networked devices. As a result, all on-premises users are able to upload data to any S3 buckets to which she or he is granted access, including their personal S3 buckets on their own personal account.

Stated differently, AWS features mechanisms to control authorization to certain S3 buckets; however, when a user is authorized to access a particular S3 bucket, AWS currently has no access control mechanisms that prevent certain types of security threats, such as confidential data leakage for example. Given a user (e.g. a network administrator, etc.) is allowed access to her or his personal public cloud storage elements (e.g., S3 buckets) via Direct Connect, even though she or he is operating within a company's network environment, confidential data leakage may occur if the user intentionally or accidentally sends company confidential data to her or his own personal S3 bucket in lieu of S3 buckets designated to the company.

Greater controls in data transfer to public cloud storage services are needed.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
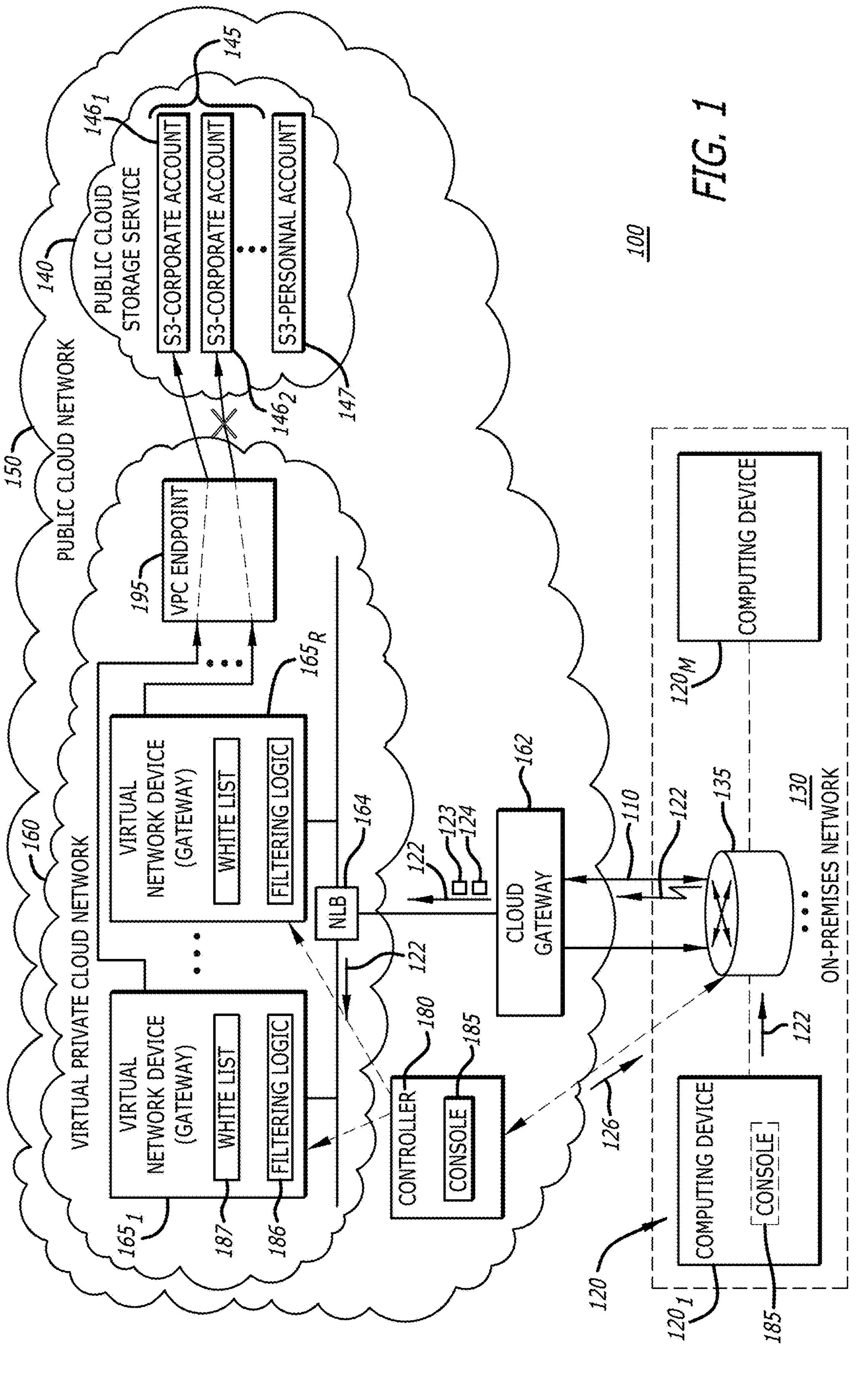
FIG. 1 is a first exemplary embodiment of a system that provides secure transfer of objects from a public cloud storage service via a dedicated (private) connection.

Embodiments of a system and method for improved security in the transfer of objects (e.g., files, programs, documents, images, video or audio clip, etc.) to/from public cloud-based storage over a dedicated communication link is shown. The improved security is based, at least in part, on controlled access to cloud-based storage elements within a public cloud storage service. This controlled access may be achieved by configuring the secure object transfer system with the following operability: (1) direct all cloud storage access messages from computing devices deployed within a company's on-premises network (hereinafter, "on-prem computing devices") to a specific private Internet Protocol (IP) address; (2) automated retrieval of identifiers of cloud-based storage elements associated with access accounts authorized for a company (e.g., corporation, organization, etc.); and (3) filtering, including names of cloud-based storage elements and/or Fully Qualified Domain Name (FQDN), to restrict access of on-prem computing devices to some or all of the retrieved cloud-based storage elements in accordance with one or more security policies.

More specifically, according to one embodiment of the disclosure, secure object transfer system features a specifically configured virtual private cloud network (VPC), which includes a network load balancer (NLB) and a plurality of virtual network devices (e.g., gateways) with filtering logic. Certainty logical elements of the VPC, most notably the gateways, may be configured by a controller. Herein, the secure object transfer system supports object transfers without use of a public virtual interface (VIF), which advertises the entire S3 public address range to users of the on-prem computing devices. Instead, according to one embodiment of the disclosure, the secure object transfer system relies on an on-prem Domain Name System (DNS) server, deployed as part of the on-premises network, to direct any access messages destined for cloud-based storage elements within the public cloud storage service to a private Internet Protocol (IP) address of the NLB.

For clarity sake and illustrative purposes, the secure object transfer system is described as being deployed within a particular public cloud network such as AMAZON WEB SERVICES™ (AWS). For this deployment, the public cloud storage services constitute Simple Storage Service (S3) storage and the cloud-based storage elements constitute S3 buckets. However, it is contemplated that the secure object transfer system may be deployed within other public cloud network infrastructures (e.g., AZURE®; GOOGLE CLOUD PLATFORM®, etc.).

As described below, the secure object transfer system relies the DNS server to direct an access message, destined for a public cloud-based element (e.g., S3 bucket), to the private IP address of the NLB. According to one embodiment of the disclosure, the access message may constitute a HTTPS GET message to retrieve content from a cloud-based storage element such as a S3 bucket. According to one embodiment of the disclosure, the access message may constitute a HTTPS POST message to write contents into a targeted S3 bucket.

Initiated from the on-prem computing device, the HTTPS traffic (e.g., access message) is directed to the NLB via an AWS Application Programming Interface (API) or an AWS Command Line Interface (CLI) for example. Subsequently, the NLB directs the access message to a selected gateway responsible for controlling access to the cloud-based storage elements (e.g., S3 buckets). For selection of the gateway, the NLB may be configured in accordance with any type of load balancing scheme (e.g., number of message being handled by the gateway or queued for handling, utilization level of virtual processors associated with the gateways, etc.).

Upon receipt of the access message directed to retrieval of a stored object from AWS S3 storage for example, the gateway may be configured to execute filtering logic. Herein, the filtering logic operates as a security service specifically designed for workloads or applications in the public cloud by filtering Transmission Control Protocol (TCP) and/or User Datagram Protocol (UDP) traffic including HTTP, HTTPS and SFTP traffic. Such filtering may involve analyses of a portion or portions of an incoming access message (e.g., an identifier for a S3 bucket to be accessed such as a S3 bucket name, a source IP address, etc.) in relation to a "whitelist" (e.g., list of permitted S3 bucket names or permitted IP address range to access the company's S3 buckets) or a "blacklist" (e.g., list of unpermitted S3 bucket names or unpermitted IP address ranges) to pass and drop the incoming access message. According to one embodiment of the disclosure, the filtering logic may be FQDN logic as each S3 bucket may be specified by a unique FQDN name that, according to some embodiments, may be based on a full Uniform Resource Locator (URL) to access an object in that S3 bucket.

For example, upon receipt of the access message directed to retrieval of a stored object from AWS S3 storage for example, the filtering logic of the gateway (selected by the NLB) may be configured to apply certain constraints for access controls. For example, the filtering logic may be configured to only allow network traffic (e.g., HTTPS traffic) sourced by or destined to a particular domain. For example, the filtering logic may allow traffic from a particular fully qualified domain name (e.g., "www.aviatrix.com," "en.CompanyA.org," etc.) which may be included in the whitelist. Additionally, or in the alternative, the filtering logic may rely on whitelist information including S3 bucket names in lieu of domain names. For example, the gateway may be configured to parse the access message and extract a S3 bucket name to which the access message pertains (e.g., S3 bucket maintaining the stored object to be accessed). Thereafter, in accordance with one or more security policies generated and maintained by the controller for VPC connectivity to AWS S3 storage, the filtering logic determines whether the access message is valid (e.g., the request is directed to a S3 bucket permitted by the security policy).

According to another embodiment of the disclosure, the filtering logic may be further configured to conduct a preliminary filtering (pre-filtering) operation to ensure that the access message received from an authorized on-prem computing device. This filtering operation may be performed by the controller establishing a security policy, provided to each of the gateways within the VPC, which confirms that the source IP address for the access message resides within a Classless Inter-Domain Routing (CIDR) address range reserved for that on-premises network. The CIDR address range may be identified by an administrator for the user during initial account configuration. Based on this preliminary filtering, the gateways can ensure that the access message originated from an authorized on-prem computing device and a subsequent determination can be made as to whether access to a particular S3 bucket is permitted for that on-prem computing device.

Upon determining that the S3 bucket access is permitted based on the filtering and/or pre-filtering operations, the gateway may conduct a destination network address translation on content within the access message to determine a public IP address for the S3 bucket. This address translation may be based, at least in part, on the source IP address of the access message.

In accordance with another embodiment of the disclosure, where a single gateway is deployed within the VPC, the DNS server may be configured to direct any access messages destined for cloud-based storage elements to that gateway. Given the single gateway, no NLB needs to be instantiated by the controller deployed with the public cloud network, as described below.

Herein, according to yet another embodiment of the disclosure, the controller is configured with storage element detection logic to significantly improve usability and security of the S3 storage scheme by automatically retrieving names for S3 buckets (S3 bucket names) utilized by accounts associated with a particular account holder (e.g., company). In particular, the storage element detection logic is configured to automatically collect S3 bucket names associated with authorized accounts for the particular account holder, where access to the S3 bucket may be approved or disapproved by a network administrator via a console provided by the controller. These collected S3 bucket names may be used to generate fully qualified domain names (FQDNs) for inclusion within the above-described whitelist that is relied upon by the gateways in the filtering unpermitted access messages. The storage element detection logic improves usability by avoiding manual import of permitted S3 buckets into the whitelist, thereby avoiding human error in entry of the FQDNs. The storage element detection logic further improves security by preventing accidental or intentional manual input of S3 buckets that are not owned by the account holder.

In summary, according to one embodiment of the disclosure, the DNS server operating in cooperation with the on-premises network may be configured to resolve access messages (e.g., messages requesting access to S3 buckets) to a private Internet Protocol (IP) address of an AWS Network Load Balancer (NLB). NLB is an Amazon Web Services (AWS) tool that distributes end user traffic across multiple cloud resources (e.g., multiple gateways) to ensure low latency and high throughput for applications. Alternatively, in lieu of the NLB, the DNS server may be configured to resolve S3 bucket access messages to a private IP address of a targeted gateway without reliance to load balancing. The gateway(s) may be deployed as a software instance within a virtual private cloud (VPC).

After gateway selection by NLB (or the targeted gateway already established), the message initiated by the on-prem computing device is directed to the gateway. After receipt of the access message, the gateway parses the message to filter out a name of the public cloud-based storage element (e.g., S3 bucket name). Then, the gateway perform a destination address translation on the message received from on-prem computing device to any valid public IP address for a S3 bucket that falls within a range of public IP addresses published by AWS. The selected gateway then forwards content of the access message, via a VPC endpoint (described below) to the selected public IP address for storage of an object accompanying the access message or retrieval of an object identified in the access message.

Herein, the secure object transfer is configured with certain functionality to control access to S3 storage. First, the DNS server (or on-prem computing device) in communications with Direct Connect resolves all S3 bucket names under management to a private IP address of the NLB (or a targeted gateway). Second, the controller associated with the gateway (or multiple gateways accessed via the NLB) is configured, using a console associated with the controller (hereinafter, "controller console"), to generate a whitelist that features one or more names of S3 buckets identified to be exclusively utilized and reserved for the account holder. Lastly, when the selected or targeted gateway receives the message, it relies on filtering logic to filter out the unauthorized S3 bucket access. In particular, the secure object transfer is optimized for managing access to S3 bucket(s) from on-prem computing devices. For traffic initiated from VPC, the filtering logic is relied upon for not only S3 access control but also all Internet bound egress control.

In accordance with one operation of the secure object transfer system, each gateway in the VPC may include filtering logic that is configured to filter out S3 bucket access messages that are unauthorized for a particular S3 bucket based on policies established for storage management for that account holder. Operating as a virtual routing device, the VPC endpoint is created by the controller to serve S3 storage so that data may be transferred entirely within the AWS public cloud infrastructure to avoid incurring costs for Internet-based data transfers charged by AWS and other public cloud providers.

I. Terminology

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "computing device" may be construed as virtual or physical device. For instance, as an illustrative example, the computing device may correspond to a virtual device in the form of a software component (e.g., a virtual machine). Alternatively, in some embodiments, the computing device may correspond to physical device, such as an electronic device that is communicatively coupled to a network and assigned an Internet Protocol (IP) address. Examples of computing devices, residing as part of the "on-premises" (or local) network, may include, but are not limited or restricted to a personal computer (e.g., desktop, laptop, tablet or netbook), a mobile phone, a standalone appliance, a sensor, or the like.

The term "computerized" generally represents that any corresponding operations are conducted by hardware in combination with software and/or firmware. Also, the term "object transfer" may generally represent either (i) a storage of an object from a computing device into a public cloud storage service and/or (ii) the retrieval of an object from a public cloud storage service by the computing device.

The term "gateway" may refer to a physical device or a software instance deployed within a cloud computing platform, such as a public cloud network for example, where the gateway at least controls the flow of data traffic from a virtual private cloud network (VPC) to one or more remote sites including computing devices that may process, store and/or continue the routing of data. For example, the terms "transit gateway" and "spoke gateway" may refer to gateways having similar architectures, but are identified differently based on their location/configurations within the VPC. For instance, a "transit" gateway may correspond to a logical instance that is configured to further assist in the propagation of data traffic (e.g., one or more messages) directed to a spoke gateway, namely another logical instance in communication with the transit gateway to isolate workload.

The term "message" generally refers to information in a prescribed format and transmitted in accordance with a suitable delivery protocol. Hence, each message may be in the form of one or more packets, frames, command or series of commands, or any other series of bits having the prescribed format.

The term "transmission medium" may be construed as a physical or logical communication path between two or more electronic devices. For instance, a physical communication path may include wired interconnects in the form of electrical wiring, optical fiber, cable, bus trace, or the like. A logical communication path may include a wireless channel relying on different frequency ranges such as a type of radio frequency (RF) or cellular frequency. One example of a transmission medium may include Direct Connect being a cloud service solution that supports a dedicated, private network connection to AWS in lieu of an Internet-based connection.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General System Architecture

Referring to FIG. 1, a first exemplary embodiment of a system 100 adapted to support the transfer of objects over a dedicated (private) connection 110 between a computing device 120 deployed within an on-premises network 130 and a public cloud storage service 140 deployed within a public cloud network 150. The object transfer is managed by logic within a virtual private cloud network (VPC) 160 as described below.

More specifically, the secure object transfer system 100 operates, at least in part, within the public cloud network 150 such as Amazon Web Services™ (AWS) is shown. In particular, the secure object transfer system 100 includes the VPC 160, which is communicatively coupled to (i) one or more computing devices $\mathbf{120}_1$-$\mathbf{120}_M$ (M≥1) operating within an on-premises network 130 and (ii) reserved cloud-based storage elements 145 such as a first set (one or more) of cloud-based storage elements $\mathbf{146}_1$-$\mathbf{146}_N$ (N≥1, N=2 as shown) operating within the public cloud storage service 140. Herein, for an AWS deployment, the cloud-based storage elements $\mathbf{146}_1$-$\mathbf{146}_N$ may represent selected portions of AWS S3 storage assigned to access accounts for the user (company) associated with the VPC 160 (e.g., S3 buckets assigned to an account holder accessible by representatives of the account holder). For example, an employee connected to the on-premises network 130 may be authorized to access S3 buckets 145 via computing device $\mathbf{120}_1$, such as one or more S3 buckets $\mathbf{146}_1$-$\mathbf{146}_N$ (corporate account) for example, while the employee is unable to access her or his own S3 bucket 147 (personal account).

According to one embodiment of the disclosure, a controller 180 is communicatively coupled to one or more virtual network devices operating as gateway(s) $\mathbf{165}_1$-$\mathbf{165}_R$ (R≥1) within one or more virtual private cloud networks, such as the VPC 160 for example. Herein, the controller 180 is configured to automatically ascertain, on a periodic or aperiodic basis, all S3 buckets $\mathbf{146}_1$-$\mathbf{146}_N$ assigned to the account holder (company). This determination may be conducted by determining all of the accounts maintained by the account holder (company) and gathering names assigned to these S3 buckets $\mathbf{146}_1$-$\mathbf{146}_N$. At configuration and at certain scan times within regions occupied by the gateway(s) $\mathbf{165}_1$-$\mathbf{165}_R$, the controller 180 identifies new S3 buckets added to the company's access account(s) and transmits a message 126 (e.g., email message, text message, automated voice message, etc.) to a network administrator, requesting that the administrator login to the controller 180 and review a S3 bucket dashboard, namely a displayable, interactive image presented as part of a console 185 provided by the controller 180.

Herein, the console 185 operates as an input/output (I/O) interface provided by the controller 180 and rendered on a display element of a computing device of the administrator (e.g., computing device $\mathbf{120}_1$ as shown). More specifically, the console 185 provides the S3 bucket dashboard 260 (see FIG. 2B), which includes a list of newly discovered S3 buckets 270, accessible by an administrator of the account holder (e.g., the company associated with the on-premises network 130 of FIG. 1). Thereafter, the network administrator may be provided the list to approve or disapprove what S3 buckets are accessible (e.g., storage, retrieval, both storage and retrieval) by the computing devices $\mathbf{120}_1$-$\mathbf{120}_M$ via the gateway(s) $\mathbf{165}_1$-$\mathbf{165}_R$ deployed within the VPC 160.

Figure 2A:
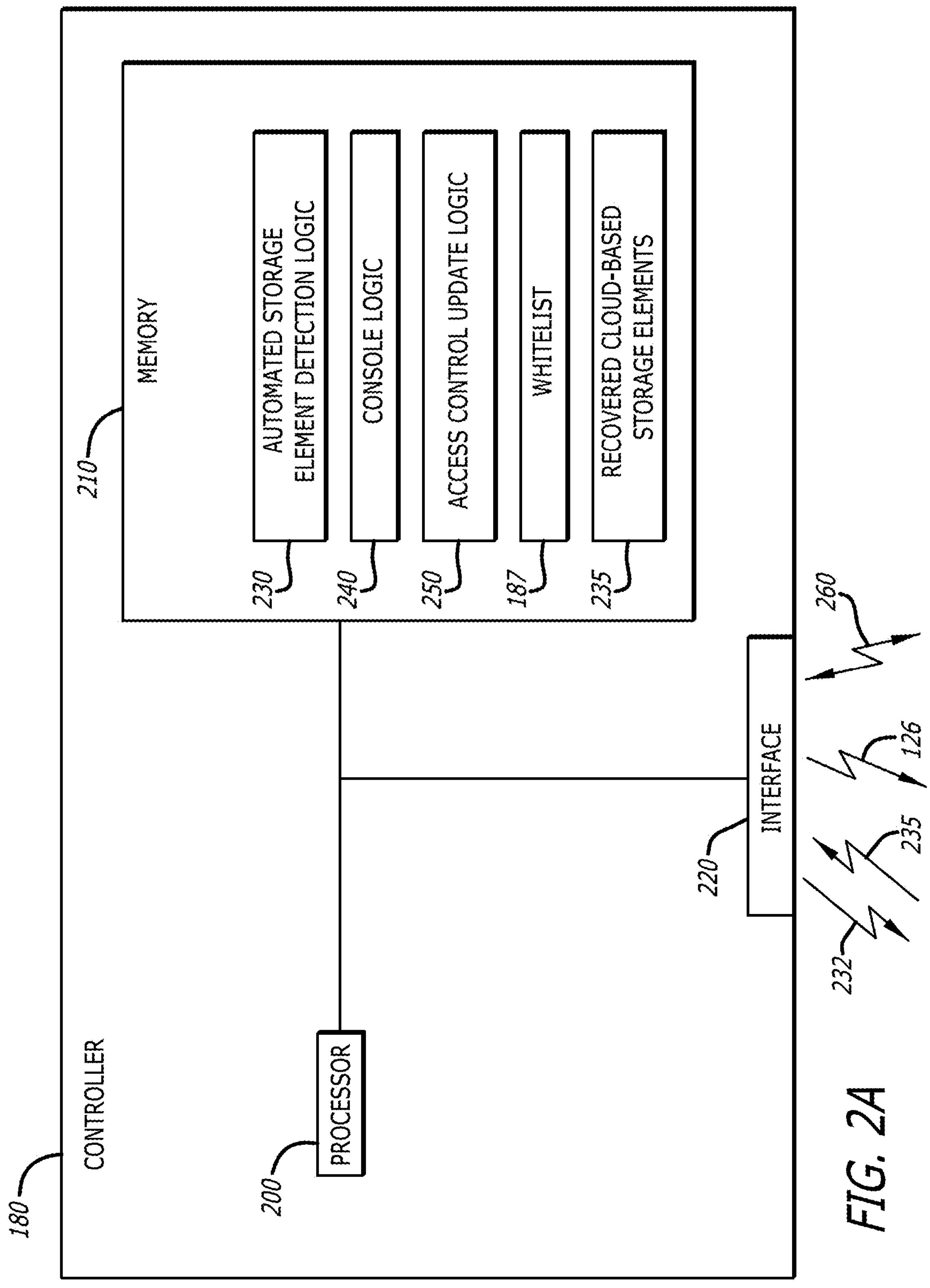
FIG. 2A is an exemplary embodiment of a controller adapted to configure operability of the secure object transfer system of FIG. 1.
Figure 2B:
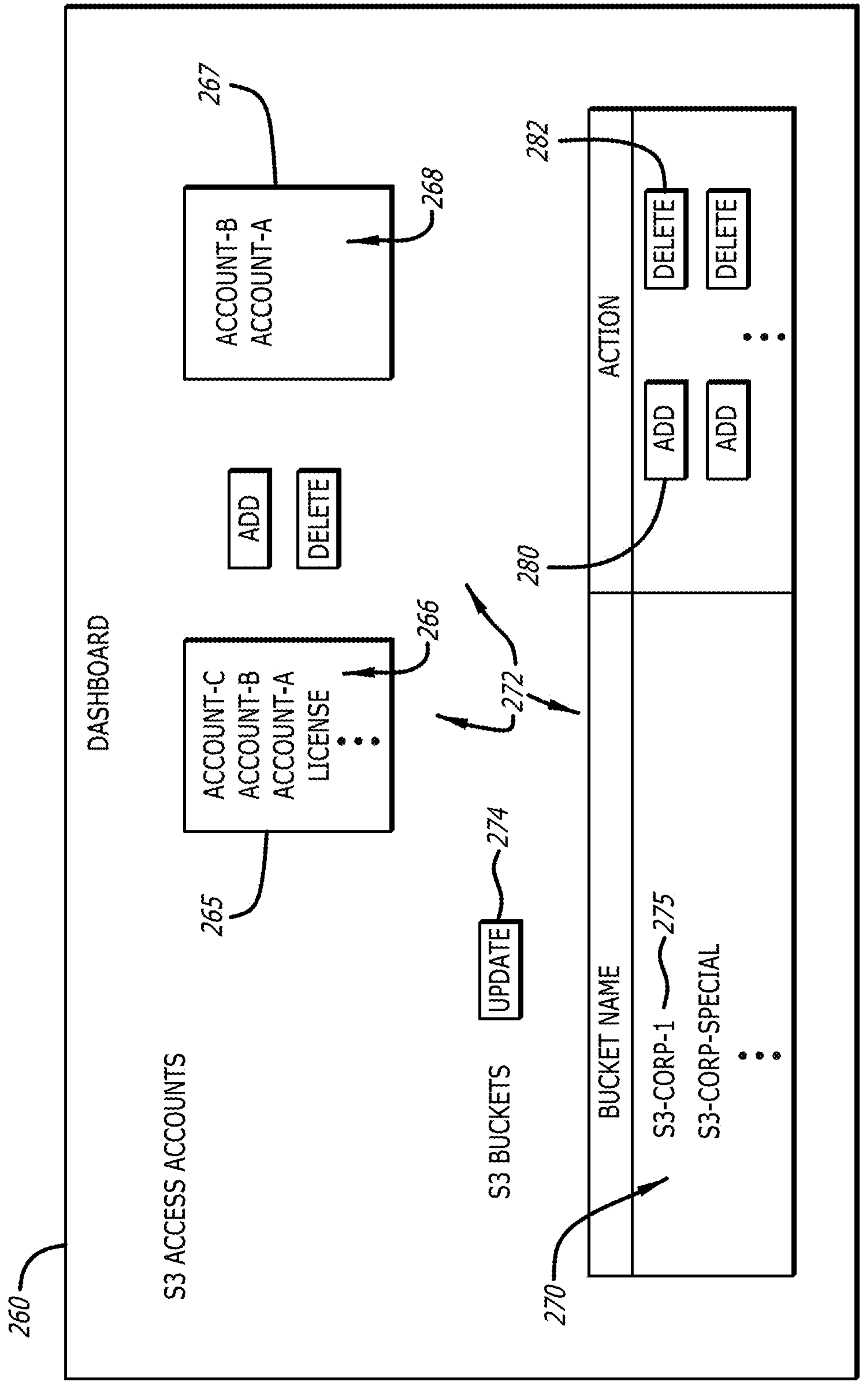
FIG. 2B is an exemplary embodiment of a S3 bucket dashboard generated by the controller of FIG. 2A.

More specifically, according to one embodiment, the console 185 may be configured with the S3 bucket dashboard 260 as shown in FIG. 2B. The S3 bucket dashboard 260 includes one or more display panels 272 with at least the name(s) of the newly discovered S3 bucket(s) 270 along with one or more selectable display elements 280/282 (e.g., radio buttons, etc.) to allow the network administrator to approve or disapprove inclusion of S3 buckets within the first set of S3 buckets 266 displayed in a first panel 265 of the S3 bucket dashboard 260. The first set of S3 buckets 266 are S3 buckets reserved the account holder (the company) and a second set of S3 buckets 268, displayed within a second panel 267, that a potentially accessible by the computing devices $\mathbf{120}_1$-$\mathbf{120}_M$, when authorized access is provided.

As further shown in FIG. 1, the VPC 160 includes the gateway(s) $\mathbf{165}_1$-$\mathbf{165}_R$, a gateway provided by a cloud provider (hereinafter, "cloud gateway") 162 and network load balancing logic 164, such as an AWS Network Load Balancer (NLB). The cloud gateway 162 is a logical cloud element used as a termination point for the dedicated connection 110 (e.g., AWS's Direct Connect) with the on-premises network 130. When a particular computing device $\mathbf{120}_1$, . . . or $\mathbf{120}_M$ (e.g., computing device $\mathbf{120}_1$) attempts to gain access to a particular cloud-based storage element within the public cloud storage service 140 (e.g., S3 bucket $\mathbf{146}_1$ with AWS S3 Storage Services), the computing device $\mathbf{120}_1$ issues an access message 122, which includes a private IP address 123 of the NLB 164 in efforts to gain access to the particular cloud storage element. The access message 122 further includes a S3 bucket name 124 associated with a data transfer initiated by this access message 122.

Herein, continuing this embodiment of the disclosure, when deployed, the NLB 164 is responsible for selecting one of the plurality of gateways $\mathbf{165}_1$-$\mathbf{165}_R$ to handle interaction between the public cloud storage service 140 and the computing device $\mathbf{120}_1$. The selection process may be based on (i) load currently handled by each of the gateways $\mathbf{165}_1$ . . . or $\mathbf{165}_R$ and/or (ii) one or more modulo operations on selected data within the access message 122 issued by one of the computing devices $\mathbf{120}_1$-$\mathbf{120}_M$ (e.g., IP source address, etc.) and routed over Direct Connect 110, or the like. The load may be monitored by logic within the NLB 164 maintaining (i) a number of queries being processed by each gateway, and/or (ii) a number of communication sessions currently being handled by each gateway, and/or (iii) utilization metrics for each gateway, or the like.

Herein, according to one embodiment of the disclosure, a Domain Name System (DNS) server 135 is deployed as part of the on-premises network 130 and is configured to direct any access message destined for any of the cloud-based storage elements 145 within the public cloud storage service 140 to a private Internet Protocol (IP) address of the NLB 164 being part of the VPC 160. In particular, the DNS server 135 is configured to direct the access message 122 (e.g. HTTPS GET or POST request) that is destined for one of the cloud-based storage elements (e.g., S3 bucket) 145 to the private IP address of the NLB 164. Initiated from one of the computing devices $120_1$-$120_M$, the HTTPS traffic (e.g., access message 122 from computing devices $120_1$) is directed to the NLB 164, which subsequently directs the access message 122 to a selected gateway instance (e.g., gateway $165_1$). The selection of the gateway instance $165_1$ may be based on any type of load balancing scheme (e.g., number of messages handled by the gateway or queued for handling, utilization level of virtual processors associated with the gateways, etc.).

According to one embodiment of the disclosure, the secure object transfer system 100 operates by launching a gateway $165_1$ or a plurality of gateways $165_1$-$165_R$ in the VPC 160. The plurality of gateways $165_1$-$165_R$ are communicatively coupled to the NLB 164, which operates, at least in part, to select a particular gateway (e.g., gateway $165_1$ . . . or gateway $165_R$) to handle the interaction with the S3 buckets $146_1$-$146_N$ based on incoming access messages.

Herein according to one embodiment of the disclosure, each gateway $165_1$-$165_R$ in the VPC 160 may be configured with filtering logic 186 and access control data 187 (e.g., a whitelist) provided from the controller 180. The whitelist 187 includes identifiers of authorized S3 buckets to which representatives of the company (end users) have access. Each "identifier" may include a unique name for a corresponding S3 bucket $146_1$ . . . and/or $146_N$ of the cloud-based storage service 140 to which the user is authorized to access. One type of identifier may include a fully qualified domain name or a variation thereof. Further, all of the objects maintained by the S3 buckets 145 are identified as accessible objects. As an illustrative example, S3 bucket $146_1$ is configured to store multiple (two or more) objects (e.g., file, program, document, etc.) for the account holder (company).

As further shown in FIG. 1, a VPC endpoint 195 is configured to serve the company's S3 buckets $146_1$-$146_N$ maintained by the public cloud storage service 140 so that data may appear to be transferred within the public cloud network 150 without incurring costs. Hence, objects may be copied from the computing device $120_1$ to a selected S3 bucket $146_1$ (or may be retrieved from the S3 bucket $146_1$ and made available to the computing device $120_1$). For this embodiment, the VPC endpoint 195 enables private connectivity to the VPC 160 to supported AWS services (e.g., S3 buckets 145) without requiring public IP addressing; namely, the transfer between the gateways $165_1$-$165_R$ of the VPC 160 and the S3 buckets 145 are conducted through the AWS public cloud infrastructure.

In accordance with this embodiment, using the computing device $120_1$, a user may select to store an object (e.g., file) within or retrieve an object (file) from a particular S3 bucket. Upon selection of the object within the particular S3 bucket for storage, the computing device $120_1$ may issue a first type of access message (e.g. HTTP or HTTPS POST request). Similarly, the computing device $120_1$ may issue a second type of access message (e.g., HTTP or HTTPS GET request) for retrieval of the object from the particular S3 bucket (e.g., S3 bucket $146_1$). Upon receipt of the access message 122, a gateway (e.g., gateway $165_R$) may be assigned to handle messages from the computing device $120_1$ via Direct Connect 110 during this communication session. The VPC 160 may include access control update logic (see FIG. 2A) maintained by the controller 180 to control update and distribution of access controls to each of the gateway(s) $165_1$-$165_R$, where these access controls are distributed to and relied upon by filtering logic 186 within the gateway(s) $165_1$-$165_R$ to identify whether the S3 bucket $146_1$ is one of the company's S3 buckets accessible by the user. The access controls may include any one or any combination of the following: whitelist, blacklist, domain names, port addresses, or the like. Herein, the domain names associated with a source of the access message 122 may be relied upon by the filtering logic 186 to conduct a pre-filtering operation to determine whether a source requesting access to the S3 bucket $146_1$ is permitted. Thereafter, the identifier 124 (e.g., S3 bucket name based on FQDN name) may be parsed from the message 122 and correlated with the content of the whitelist 187. As shown, the assigned gateway $165_1$ communicates with the VPC endpoint 195 to access the particular S3 bucket $146_1$ included within the access message 132.

III. General Controller Architecture

Referring to FIG. 2A, an exemplary embodiment of the controller 180 adapted to configure operability of the secure object transfer system 100 of FIG. 1 is shown. Herein, the controller 180 features a processor (e.g., a virtual processing element) 200, a memory (e.g., virtual memory) 210 and an interface (e.g., virtual connector) 220. In particular, the memory 210 includes automated storage element detection logic 230, console logic 240, and access control update logic 250.

Herein, according to one embodiment of the disclosure, the automated storage element detection logic 230 generates the whitelist 187, which identifies a subset of the S3 buckets 145 (e.g., S3 buckets $146_1$-$146_N$) that are accessible by resources within the on-premises network 130. More specifically, according to one embodiment of the disclosure, the automated storage element detection logic 230 may be configured to automatically generate, on a periodic or aperiodic based without user intervention, one or more query messages 232 to IP address locations reserved for cloud-based storage elements (e.g., S3 buckets) associated with particular access accounts (held by the account holder from which the access messages are provided) to recover information 235 that identifies all S3 buckets associated with each access account held by the account holder. The information 235 is stored within the controller 180. From the recovered information 235, the automated storage element detection logic 230 determines whether any of the S3 buckets constitutes a new S3 bucket added as a resource for that access account.

Upon discovering a new S3 bucket, the automated storage element detection logic 230 causes the controller 180 to send the message 126 (e.g., email message, text message, automated voice message, etc.) to a computing device monitored by a network administrator. The message 126 includes information requesting the administrator to establish communications with the console logic 240 of the controller 180 in order to retrieve a S3 bucket dashboard 260 (see FIG. 2B), which identifies any newly discovered S3 bucket 270 associated with the company's access accounts set forth in display area 272. Initially, the newly discovered S3 bucket(s) 270 may be excluded from (i) the first panel 265 illustrating all of the S3 access accounts held by the account holder until recognized as an authorized S3 bucket or (ii) the second panel 267 illustrating all of the S3 access accounts accessible by computing devices within the on-premises network 130, until the newly discovered S3 bucket(s) 270 is chosen to be part of the S3 buckets accessible to users of the on-premises network 130.

As further shown in FIG. 2B, upon gaining access to the S3 bucket dashboard 260, for each newly discovered S3 bucket, upon depressing update display element 274, the dashboard 260 provides a first display element 280 that, upon selection, permits potential access to a newly discovered S3 bucket 275 by the computing devices $120_1$-$120_M$ within the on-premises network 130 by propulating content displayed in the first panel 265. The dashboard 260 further provides a second display element 282 that, upon selection, precludes access to the newly discovered S3 bucket 275. Furthermore, the S3 bucket dashboard 260 allows an administrator to adjust access to each of the S3 buckets $146_1$-$146_N$, which causes the can permit or preclude access to the contents of the S3 bucket at a later time.

Referring back to FIG. 2A, the access control update logic 250 is configured to maintain (update and download) access controls, which are relied upon by filtering logic 186 to control its operability. The access controls may feature the whitelist(s) 187, which includes content accessible by the filtering logic 186 (e.g., FQDN logic, etc.) to determine whether access to an identified S3 bucket is permitted and confirm that the access request originated from an appropriate CIDR address range associated with the on-premises network of the account holder reserving the identified S3 bucket.

IV. General VPC Architecture

Figure 3:
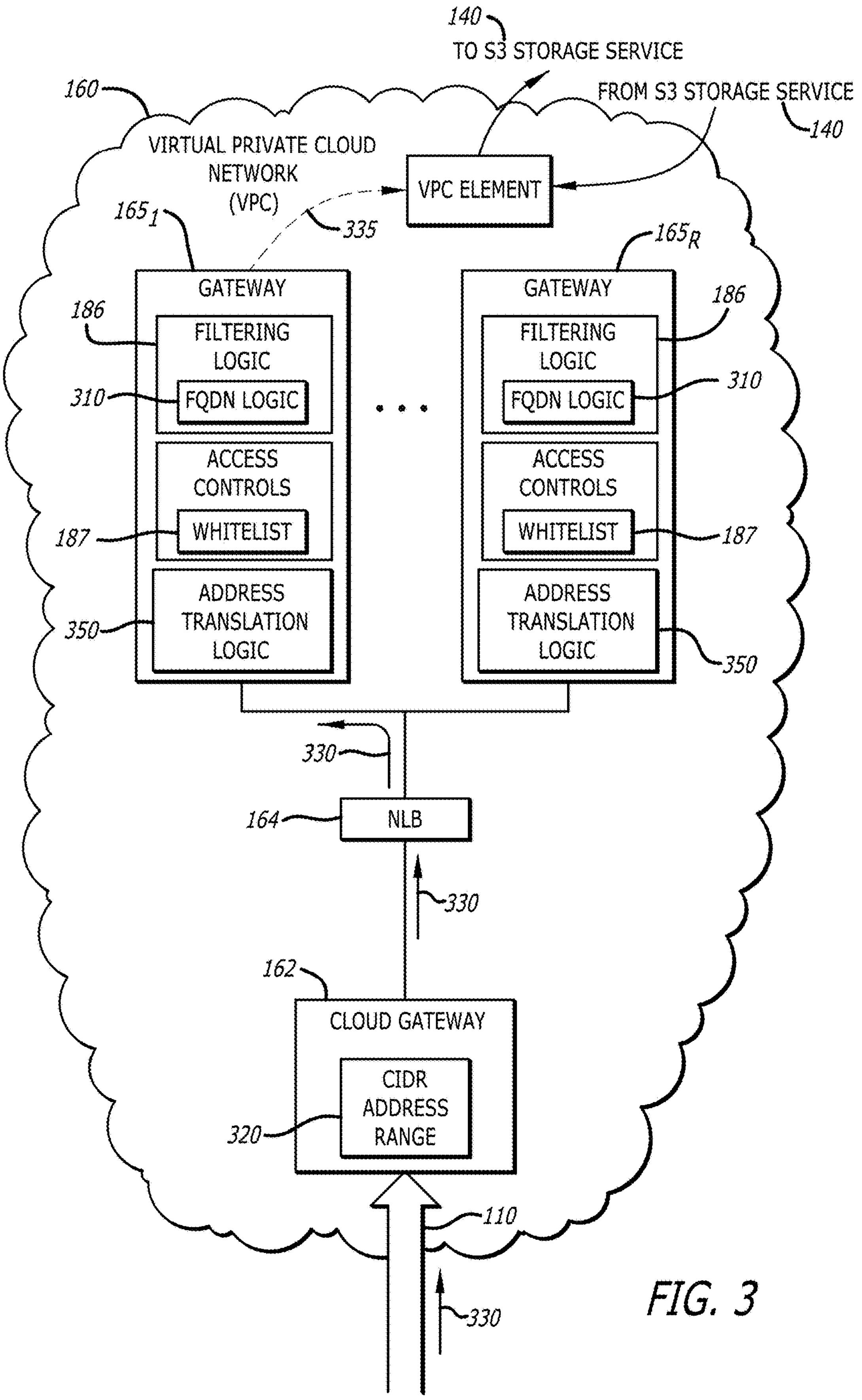
FIG. 3 is a detailed exemplary embodiment of the logical architecture of a virtual private cloud network (VPC) of the secure object transfer system.

Referring now to FIG. 3, a detailed exemplary embodiment of the logical architecture of the virtual private cloud network (VPC) 160 deployed within the secure object transfer system 100 is shown. As shown, the VPC 160 includes the cloud gateway 162, the NLB 164 and a plurality of gateways $165_1$-$165_3$ that support the storage and/or retrieval of objects 300 from one or more cloud-based storage elements (e.g., S3 buckets) $146_1$-$146_N$. Each of the gateways $165_1$-$165_3$ relies on filtering logic 186, including at least FQDN logic 310 for example, for filtering and access control enforcement.

More specifically, according to this embodiment of the disclosure, the cloud gateway 162 is a logical cloud element used as a termination point for Direct Connect 110. The cloud gateway 162 is configured to advertise a CIDR address range 320 of the VPC 160 to the computing devices $120_1$-$120_M$, and in response, receives access messages 330 (e.g., HTTPS GET, HTTPS POST, etc.) from one of the computing devices (not shown). Upon receipt of the access messages 330, the cloud gateway 162 routes these messages 330 to the NLB 164.

Each access message 330 may include information, referred to as an "identifier," which identifies the targeted destination (e.g., S3 bucket name) for the access message 330. Herein, the filtering logic 186 may include FQDN logic 310, which is responsible for filtering valid from invalid access messages based on S3 bucket names included in the access message 330. However, according to another embodiment of the disclosure, the FQDN logic 310 may be configured to filter the access message 330 based on source domain name. In accordance with the illustrative example described above, where the FQDN logic 310 is configured to only allow Internet bound traffic to www.aviatrix.com, the domain name "www.aviatrix.com" may be included in the whitelist 187. For certain HTTP/HTTPS traffic, the FQDN logic 310 also supports wild cards, such as "*" symbol. In this example, a generalized domain can be specified as "*.aviatrix.com" to allow HTTPS traffic to any domain names that ends in "aviatrix.com".

As further shown in FIG. 3, the NLB 164 is configured to select one of the gateways $165_1$-$165_R$ to receive one of the access messages 330 (e.g., access message 330 similar to access message 122 of FIG. 1) and conduct a preliminary analysis thereon. In particular, the selection of which of the gateway instances $165_1$-$165_3$ to receive the access message 330 may be based on a load balancing scheme followed by the NLB 164. Examples of different load balancing schemes may consider the number of access message being handling or queued for each gateway, utilization levels of virtual processors associated with the gateways $165_1$-$165_3$, or the like.

Each of the gateways $165_1$-$165_3$ is configured to receive access controls (e.g., whitelist 187) from the controller 180. Upon receipt of the access message 330, the selected gateway (e.g., gateway instance $165_1$) parses the access message 330 to filter out the S3 bucket name to which the access message 330 is directed. If the filtering logic 186 determines that S3 bucket name is included in the whitelist 187, address translation logic 350 deployed within the gateway instance $165_1$ performs a destination address translation on a portion of the message 330 to determine a valid public IP address of the S3 bucket (S3 has a range of public IP address published by AWS). The gateway instance $165_1$ then forwards contents 335 of the access message 330 to the translated public IP address associated with the targeted S3 bucket or retrieves a particular object accessed using the valid public IP address of the S3 bucket.

V. General Secure Object Transfer System Operability

Figure 4:
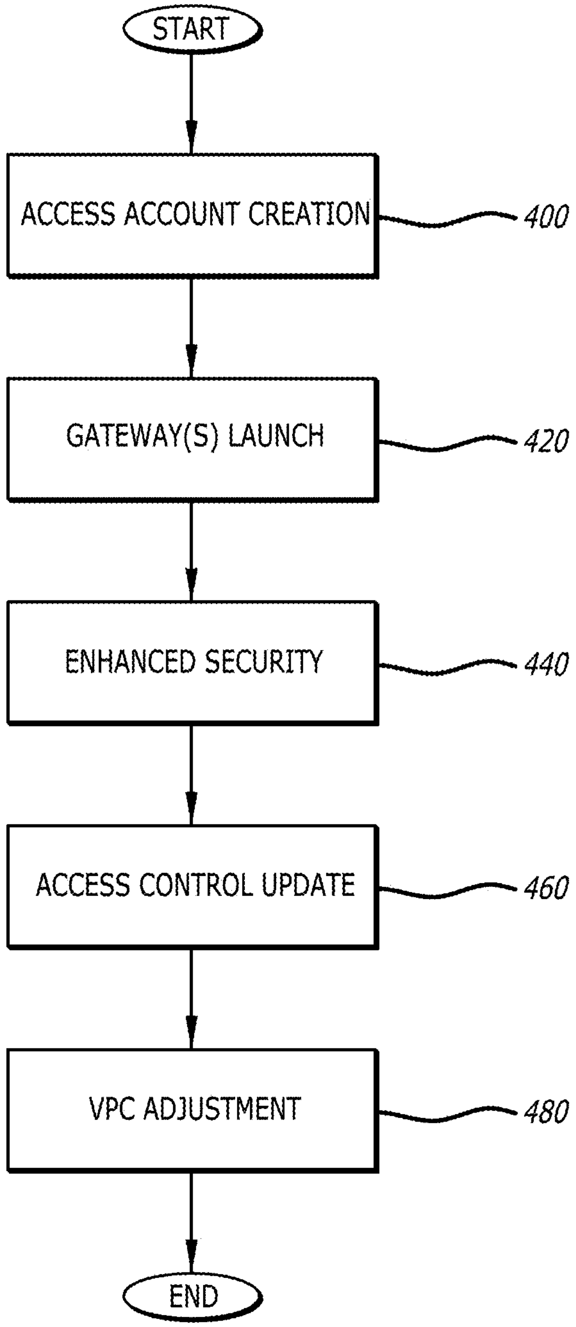
FIG. 4 is an exemplary flowchart illustrating workflow directed to the configuration the secure object transfer system of FIG. 1.

Referring to FIG. 4, an exemplary flowchart illustrating workflow directed to the configuration the secure object transfer system 100 of FIG. 1 is shown. According to this embodiment, the workflow may be described as five (5) operational phases: (1) access account creation phase 400; (2) gateway launch phase 420; (3) enhanced security phase 440; (4) access control update phase 460; and (5) VPC adjustment phase 480. Collectively, these operational phases are used in the configuration of the secure object transfer system 100.

Herein, the access account creation phase 400 involves the creation of an access account to which the cloud-based storage elements (e.g., S3 buckets) are assigned. The access account can be created through the console (I/O interface) provided by the controller.

Additionally, the access account phase may provide for activation of an automated scan for detecting deployment of new S3 buckets associated with that access account by the automated storage element detection logic of the controller (see FIG. 2A). The scan period may be a prescribed interval, prescribed day/time, or may be configurable by an administrator. When a new S3 bucket is discovered, an alert message (e.g., text, email, etc.) is sent from the controller to the network administrator to prompt the administrator to take actions (allow/deny) authorized users to the access account access to the new S3 bucket.

The gateway launch phase 420 is an operational phase in which a gateway (e.g., gateway $165_1$ of FIG. 1) is launched. Prior to launching, the gateway is configured to select of a gateway name, access account name to which the gateway pertains, region selected for the gateway, and the region for which S3 buckets, if located, are explicitly allowed or denied.

The enhanced security phase 440 is the phase in which operability of the secure data transfer system is enabled. During this phase, one or more access accounts (associated with the company) are selected for enhanced security, and thereafter, each S3 bucket associated with those selected access account is assigned a unique FQDN name. The assigned FQDN names may be based on the full URL to access objects within that S3 bucket.

Additionally, during the enhanced security phase 440, an IP address range of the on-premises network is entered. The IP address range is relied upon by the gateway selected to process an incoming access message in order to (i) identify whether an incoming access message is to undergo FQDN filtering to ascertain whether the access message is from a permitted on-premises network (i.e., source IP address of the access message falls within the entered IP address range) and (ii) determine whether access a S3 bucket, as requested by the access message, is permitted. The IP address range may be utilized for pre-filtering operations.

Once the enhanced security is enabled, the controller creates the NLB and logically connects the launched gateway to the NLB.

During the access control update phase 460, the console of the controller may be periodically (or aperiodically) accessed to set, alter or delete access controls provided to the gateway that filter access messages to confirm valid S3 bucket accesses. More specifically, during this phase, the access controls may be updated and distributed to the gateway, where the content of the access controls is relied upon by the filtering logic (e.g., FQDN logic) within the gateway to identify whether a requested S3 bucket is accessible by the user.

Lastly, as the NLB is created, the VPC adjustment phase 480 allows the controller to create (and launch) more gateways $165_2$-$165_R$ to produce the gateways $165_1$-$165_R$ that form the VPC 160 of FIG. 1. These gateways $165_2$-$165_R$ are established to communicate with the NLB for greater distribution of S3 related HTTPS requests (access messages).

Figure 5:
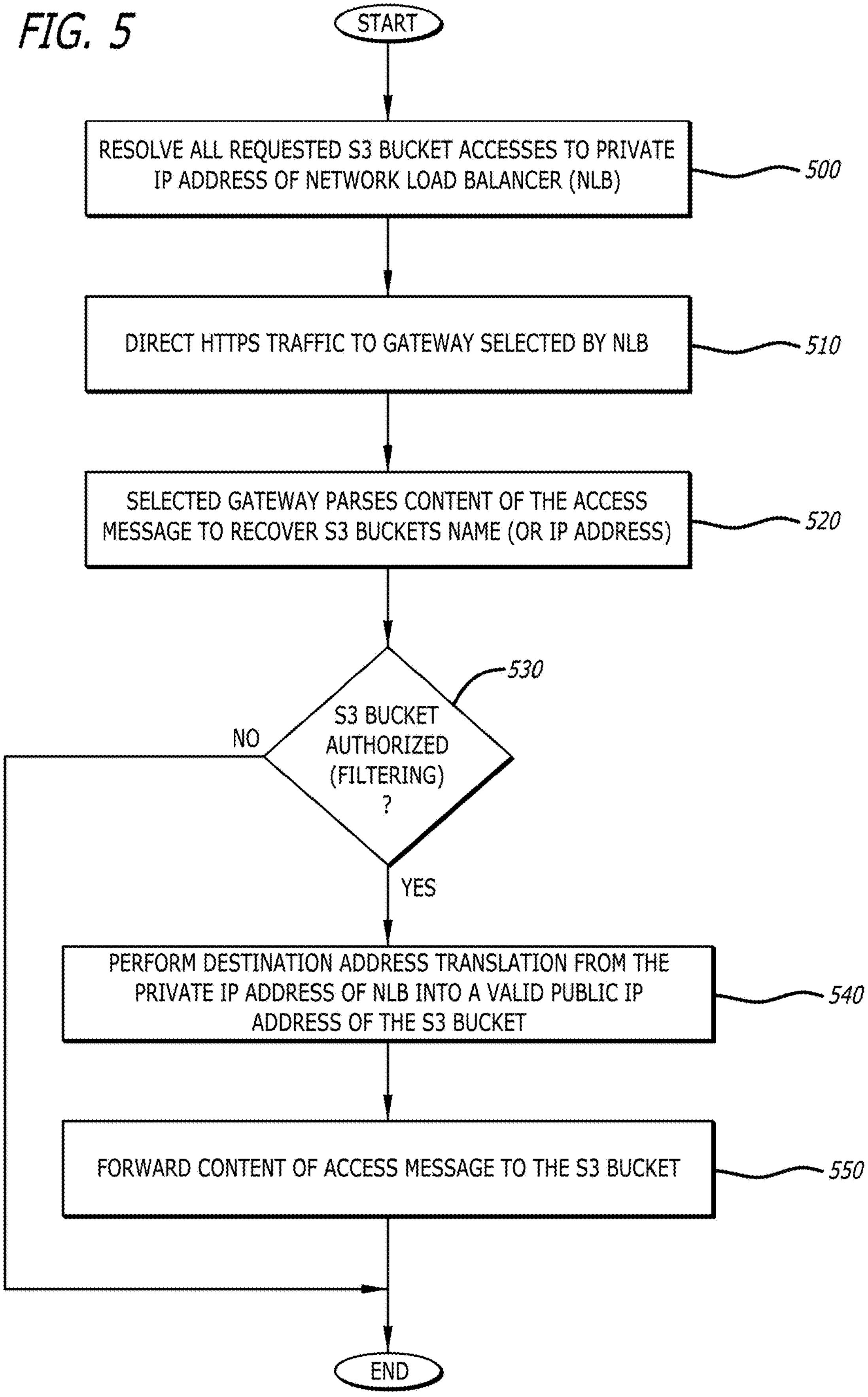
FIG. 5 is an exemplary flowchart illustrating operability of the secure object transfer system of FIG. 1.

Referring now to FIG. 5, a flowchart of an exemplary embodiment in the operability of the secure object transfer system 100 of FIG. 1 is shown. Herein, the key benefits directed to the operability of the secure object transfer system 100 include (1) transferring objects between a user of an on-prem computing device and S3 storage services by leveraging Direct Connect without using public VIF; (2) controlling which S3 buckets associated with a company to which the user belongs can be accessed; and (3) deploy multiple gateways to load balancing the HTTPS data traffic.

As an illustrative example, the exemplary operability of the secure object transfer system 100 may feature the following operations. Herein, the DNS server positioned within the on-premises network resolves requested S3 bucket accesses to the private IP address of the AWS internal NLB (or gateway private IP address is only a single gateway is deployed in the VPC (operation 500). Thereafter, the HTTPS traffic (access message) initiated from on-prem computing devices is directed to one of the gateways communicatively coupled to the NLB, where selected gateway parses the content of the access message to recover the S3 bucket name to be accessed (operations 510 and 520).

After recovery of the S3 bucket name, the selected gateway performs a filtering operation to avoid any unauthorized requests (operation 530). Where the access to the S3 bucket is authorized, the gateway then perform a destination address translation from the private IP address of the NLB to a valid public IP address of the S3 bucket, as the S3 bucket may have a range of public IP address published by AWS (operation 540). Thereafter, the selected gateway then forwards content associated with the access message to translated public IP address (operation 550). The content may include the object (or a link to the object) where the object is to be stored or a request for retrieval of an object stored in the S3 bucket to the on-prem computing device.

In the foregoing description, the invention is described with reference to specific exemplary embodiments thereof. For example, the VPC with the gateways to conduct analytics to access messages (i.e. determine whether these messages are permitted to access targeted S3 buckets) may be deployed as a spoke gateway with the Direct Connect being communicatively coupled to a transit gateway from which the access message is routed. It will be evident that various modifications and changes may be made thereto without departing from the broader spirit and scope of the invention as set forth in the appended claims.

What is claimed is:

1. A secure object transfer system comprising:
- a virtual private cloud network including:
  - a plurality of gateways, and
  - a network load balancer configured to conduct a load balancing scheme, each gateway of the plurality of gateways is configured to store or retrieve an object from a cloud-based storage element and filtering logic configured to restrict access of computing devices to certain cloud-based storage elements in accordance with a security policy;
- an on-premises Domain Name System (DNS) server configured to direct access messages destined for the cloud-based storage element within a public cloud storage service to a private Internet Protocol (IP) address of the network load balancer; and
- a non-transitory storage medium comprising a controller configured to:
  - maintain and update the security policy utilized by each gateway of the plurality of gateways, and
  - create logic that serves the cloud-based storage elements so that data from or into the cloud-based storage elements is transferred entirely within a public cloud infrastructure including the cloud-based storage elements.

2. The secure object transfer system of claim 1, wherein the network load balancer is configured to conduct a load balancing scheme on access messages from computing devices deployed within an on-premises network, and wherein each of the access messages is directed to a private Internet Protocol (IP) address of the network load balancer.

3. The secure object transfer system of claim 2, further comprising a dedicated communication link between the on-premises network and a cloud gateway of a public cloud network in which the virtual private cloud network resides, the cloud gateway communicatively coupled to the network load balancer.

4. The secure object transfer system of claim 3, wherein the dedicated communication link is a Direct Connect link and each of the cloud-based storage elements includes a Simple Storage Service (S3) bucket provided by AMAZON WEB SERVICES (AWS).

5. The secure object transfer system of claim 2, wherein an access message of the access messages includes a Hypertext Transfer Protocol Secure (HTTPS) GET message or an HTTPS PUT message.

6. The secure object transfer system of claim 2, wherein Fully Qualified Domain Name (FQDN) logic operates as a security service specifically designed to conduct a filtering by at least analyzing one or more portions of each of the access messages in relation to a whitelist or a blacklist.

7. The secure object transfer system of claim 6, wherein the one or more portions of each of the access messages includes a Simple Storage Service (S3) bucket provided by AMAZON WEB SERVICES public cloud network.

8. The secure object transfer system of claim 6, wherein the one or more portions of each of the access messages includes an Internet Protocol (IP) address within an IP address range for accessing a set of Simple Storage Service (S3) buckets.

9. The secure object transfer system of claim 2, wherein the logic operates as a VPC element that is created by the controller to serve information associated with an access message of the access messages to the cloud-based storage element associated with a particular account owned by a user issuing the access message.

10. The secure object transfer system of claim 1, wherein the controller, deployed separate and independent from the virtual private cloud network, further maintains and provides the security policy to each of the plurality of gateways, the security policy is used to determine, based on information provided from a user, whether a certain public cloud storage element is accessible to the user.

11. The secure object transfer system of claim 1, wherein the object corresponds to (i) a file or (ii) a document or (iii) a portion of software or (iv) an image.

12. The secure object transfer system of claim 1, wherein the controller is further configured to automatically ascertain, on a periodic or aperiodic basis, all cloud-based storage elements associated with a company having an access account including the cloud-based storage elements.

13. A secure object transfer system comprising:

one or more virtual private cloud networks including:

a first virtual private cloud network comprising:

a plurality of gateways, and a network load balancer configured to conduct a load balancing scheme, each gateway of the plurality of gateways includes filtering logic that operates to restrict access of computing devices to certain cloud-based storage elements in accordance with a security policy;

an on-premises Domain Name System (DNS) server configured to direct access messages destined for the cloud-based storage element within a public cloud storage service to a private Internet Protocol (IP) address of the network load balancer; and a non-transitory storage medium comprising a controller configured to:

maintain and update the security policy utilized by each gateway of the plurality of gateways, and create logic that serves the cloud-based storage elements so that data from or into the cloud-based storage elements is transferred entirely within a public cloud infrastructure in which the first virtual private cloud network resides.

14. The secure object transfer system of claim 13, wherein the network load balancer is configured to conduct a load balancing scheme on access messages from computing devices deployed within an on-premises network to store or retrieve an object from a cloud-based storage element, and wherein each of the access messages is directed to a private Internet Protocol (IP) address of the network load balancer.

15. The secure object transfer system of claim 14, further comprising a dedicated communication link between the on-premises network and a cloud gateway of a public cloud network in which the first virtual private cloud network resides, the cloud gateway communicatively coupled to the network load balancer.

16. The secure object transfer system of claim 13, wherein each of the cloud-based storage elements includes a Simple Storage Service (S3) bucket.

17. The secure object transfer system of claim 13, wherein the controller, deployed separate and independent from the one or more virtual private cloud networks, further maintains and provides the security policy to each of the plurality of gateways, the security policy is used to determine, based on information provided from a user, whether a certain public cloud storage element is accessible to the user.

18. The secure object transfer system of claim 14, wherein Fully Qualified Domain Name (FQDN) logic operates as a security service specifically designed to conduct a filtering by at least analyzing one or more portions of each of the access messages in relation to a whitelist or a blacklist.

19. The secure object transfer system of claim 18, wherein the one or more portions of each of the access messages includes an Internet Protocol (IP) address within an IP address range for accessing a set of Simple Storage Service (S3) buckets.

20. The secure object transfer system of claim 13, wherein the controller is further configured to automatically ascertain, on a periodic or aperiodic basis, all cloud-based storage elements associated with a company having an access account including the cloud-based storage elements.

* * * * *